ically successful, the synthesis disclosed by the above noted copending application has been found by subsequent investigations to involve a catalyst life that is shorter than desirable from a practical standpoint in commercial scale operations.

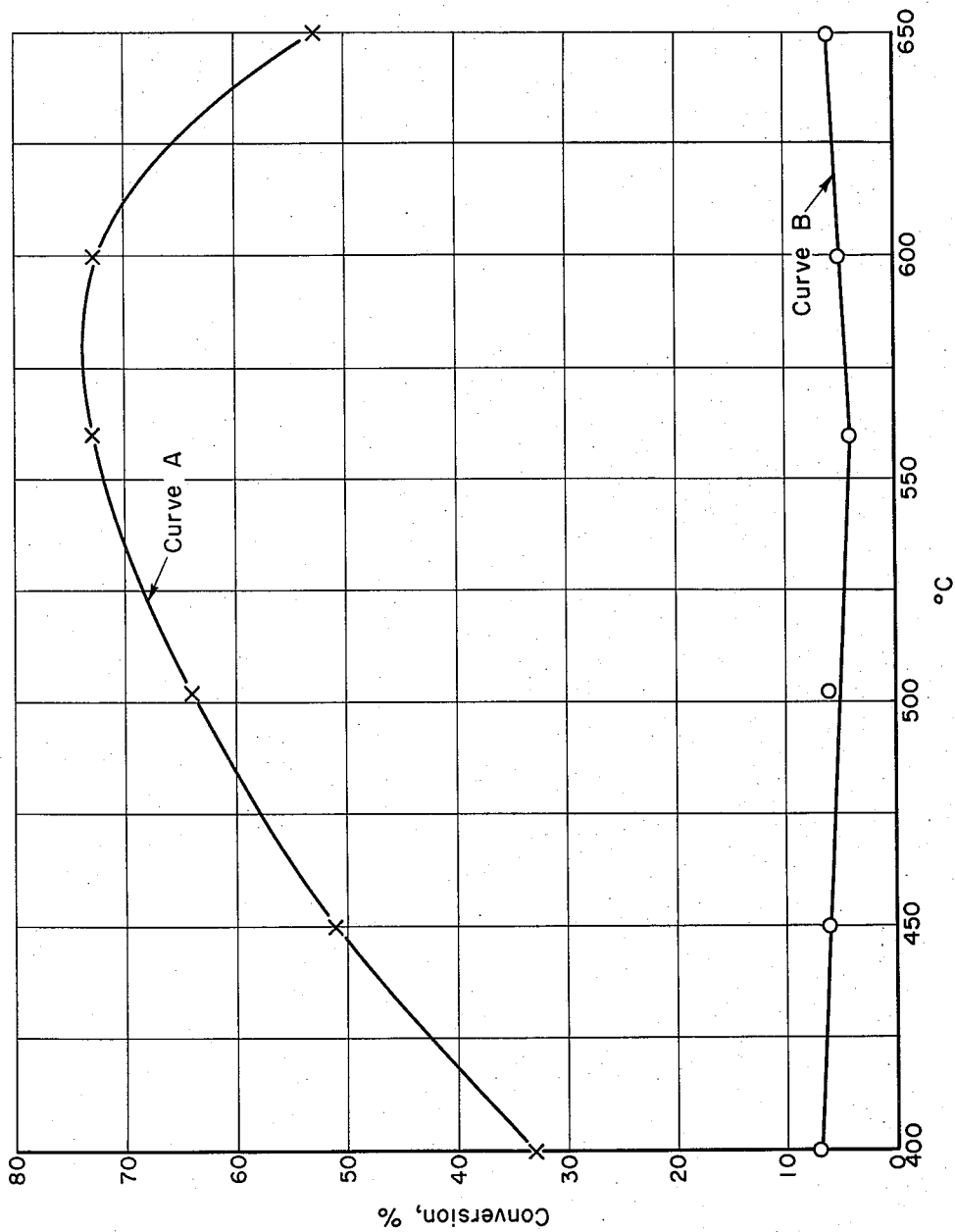

3,041,349
SYNTHESIS OF CARBAZOLES

Arthur E. Bearse and Louis J. Hillenbrand, Jr., Columbus, and Henry M. Grotta, Delaware, Ohio, assignors, by mesne assignments, to Martin-Marietta Corporation, Chicago, Ill., a corporation of Maryland
Filed Nov. 9, 1959, Ser. No. 851,737
12 Claims. (Cl. 260—315)

This invention relates to the preparation of carbazoles, and more particularly to the synthesis of carbazoles by catalytic cyclodehydrogenation of vaporized amines.

In copending application Serial No. 597,371, filed July 12, 1956, there is described and claimed a novel and uniquely successful synthesis of carbazole by vapor phase catalytic cyclodehydrogenation of diphenylamine, the synthesis being conducted in the presence of a platinum or palladium catalyst supported on a substrate of silica, alumina, or mixtures thereof. While uniquely successful, the synthesis disclosed by the above noted copending application has been found by subsequent investigations to involve a catalyst life that is shorter than desirable from a practical standpoint in commercial scale operations.

According to the present invention this undesirable limitation in catalyst life has not only been eliminated, but surprisingly improved conversions have been obtained, and the practical synthesis of other carbazoles as well has been effected, by conducting the cyclodehydrogenation reaction in the presence of a catalyst formed of platinum supported on magnesium oxide. The magnesia supported platinum catalyst employed in accordance with the present invention is alkaline in nature, whereas the catalysts of the above noted copending application have an acidic character, and this difference may account in some measure for the improved results obtained by the present invention, although the substantial improvement in catalyst life and in conversion remains surprising despite this difference or any other apparent factor.

As noted in the previously identified copending application, the principal source of carbazole at present is anthracene wastes from which the carbazole is isolated. It is known also that carbazole can be synthesized from such compounds as orthonitrobiphenyl, orthoaminobiphenyl and mixtures of these compounds in the presence of various types of catalysts. Examples of such catalysts are vanadium oxide, aluminum oxide, chromium oxide, molybdenum oxide, manganese oxide, cupric oxide, and tungsten oxide. In addition, carbazole has been prepared from diphenylamine in the presence of platinized charcoal catalysts. Syntheses by means of these catalysts involve numerous disadvantages, the use of platinized charcoal being particularly objectionable because of its short catalyst life and its inability to be regenerated after use. Carbazole recovered from anthracene wastes is contaminated with impurities characteristically present in anthracene waste, which only can be removed, if at all, by difficult purification steps. In processes using carbazole as a chemical intermediate, the impurities present in carbazole derived from anthracene wastes are tolerated only because of the impracticability of purifying the carbazole. In many uses of carbazole, for example in the manufacture of dyestuffs, it would be highly desirable and preferable to use pure carbazole, free from the usual anthracene waste impurities.

The present invention makes it possible to produce carbazole synthetically, free from undesirable anthracene waste impurities, by catalytic cyclodehydrogenation of diphenylamine with a catalyst, namely, magnesia supported platinum as previously noted, which can be regenerated effectively, and which promotes the cyclodehydrogenation reaction exceptionally upon proper control of the operating conditions. By proper control of such operating conditions as temperature and the rate at which the diphenylamine is introduced into the reaction zone, it is possible to control the process so as to yield substantial quantities of carbazole, while producing only relatively small quantities of any by-products. In addition, conducting the reaction in the presence of steam has been found to substantially enhance the cyclodehydrogenation of diphenylamine to produce carbazole. The presence of hydrogen during the reaction helps to maintain catalyst activity. For this purpose, hydrogen may be desirable, although better conversions of diphenylamine to carbazole may be obtained in the absence of hydrogen. Steam exhibits an apparently different effect on the cycloheydrogenation reaction than hydrogen, in that the steam produces an almost immediate noticeable improvement in conversion and yield. Hydrogen, on the other hand, shows no immediate advantage, but rather shows its effect by continuous longer periods of high conversion, indicating its ability to prolong the catalyst's activity. If desired, the reaction may be conducted in the presence of mixtures of hydrogen and steam and thus obtain the benefits of the enhancing activity of steam and the catalyst's activation by the hydrogen.

Other carbazoles may be obtained by catalytic cyclodehydrogenation over the magnesia supported platinum catalyst by using diaryl amines and diamines other than diphenylamine for the feed material. For example, when phenyl-beta-naphthylamine is used as the feed material, 2,3-benzocarbazole is obtained, and cyclodehydrogenation of phenyl-alpha-naphthylamine yields 1,2-benzocarbazole, while indolo-[3,2-b]-carbazole has been found to result from N,N'-diphenyl-p-phenylenediamine, and indolo-[2,3-b]carbazole from N,N'-diphenyl-m-phenylenediamine, which indolocarbazoles have never been made or identified before insofar as we are aware. The synthetic preparation of carbazoles of high purity should be of considerable interest to the dyestuff and other chemical industries, especially since the indolocarbazoles and benzocarbazoles prepared herein are dye intermediates that can be nitrated, reduced, diazotized and coupled.

While a variety of diaryl amines and diamines may be used as the feed material, the following detailed description of the applicants' process frequently describes the use of diphenylamine as the feed material resulting in the preparation of carbazole itself after the catalytic cyclodehydrogenation. Diphenylamine is representative of this class of amines and carbazole is the simplest member of the carbazoles. It should be expressly understood that the following discussion applies with equal force when diaryl amines and diamines other than diphenylamine are used as the feed material, with the resulting cyclodehydrogenation to form the respective carbazoles.

In general, the process of this invention is carried out by contacting vaporized diaryl amines or diamines, for example, diphenylamine, with the catalyst. The diphenylamine may be brought into contact with the catalyst by passing a stream of gas through diphenylamine that has been heated above its melting point. The stream of gas passing through the heated diphenylamine serves as a carrier for the diphenylamine, bringing it into the reaction zone for contact with the catalyst at elevated temperatures. The gas for this purpose may be steam, hydrogen, or, conveniently, mixtures thereof, since the hydrogen-steam mixtures serving as a carrier may otherwise advantageously be present in the reaction zone. In addition, vaporized diphenylamine may be introduced independently into the reaction zone without the aid of a carrier gas. The carbazole produced is collected in any convenient manner, such as by condensation at the outlet of the reaction vessel. The carbazole is recoverable from the reaction product by any of several techniques, such as crystallization, sublimation, and extraction. Thus, pure carbazole may easily be isolated by simple separation techniques, from any by-products formed, which include benzene, aniline, and ammonia. Other carbazoles are obtained comparably from starting materials consisting of the corresponding diarylamines and diamines.

Thus, in the synethetic dye industry, for example, pure carbazole is made available, the use of which obviates disadvantages of the characteristically impure carbazole derived from anthracene wastes. The unconverted diphenylamine recovered from the reaction products may be recycled to the reaction zone. In addition, other carbazoles desired by the chemical industry may be readily synthesized by this process.

It is a discovery of this invention that the formation of by-products, such as benzene, may be maintained at a minimum, at maximum conversion and yield of the diphenylamine to carbazole. Applicants have discovered that at elevated temperatures, about 400° C. and above, carbazole is produced in substantially greater amounts than the by-products. The reaction preferably is conducted at temperatures of above 400° C. and, ordinarily, the reaction need not be conducted at temperatures in excess of about 650° C. At about 400° C. and above, this process yields increasing amounts of carbazole, while the by-products formed remain essentially a low constant. Thus, over a considerable temperature range, the cyclodehydrogenation reaction is favored and occurs almost to the exclusion of the hydrogenolysis reaction to form the by-products.

The FIGURE in the drawing is a graph illustrating the effect of temperature on the cyclodehydrogenation reaction and the formation of such by-products as benzene. Curve A of the graph shows the percent conversion of diphenylamine to carbazole over the temperature range indicated. Curve B shows the percent of diphenylamine converted to benzene, over the same temperature range. At temperatures of about 400° C. and above, substantially more diphenylamine is converted to carbazole than is converted to benzene. Thus, beginning at a temperature of about 400° C., the cyclodehydrogenation reaction surprisingly and favorably occurs in substantial preference to other reactions forming such products as benzene and aniline.

Preferably the reaction is conducted at temperatures beginning at about 500° C. and above, for the reason that at these higher temperatures the reaction produces maximum or near maximum conversion of diphenylamine to carbazole, while producing minimum amounts of such by-products as benzene and aniline. As previously stated, the reaction ordinarily need not be conducted at temperatures in excess of about 650° C. The temperature of 650° C. is not an absolute maximum operating temperature beyond which the reaction does not proceed. As shown by Curve A of the graph, it is at about temperatures in the neighborhood of 650° C. that the conversion of diphenylamine to carbazole begins to decrease. But, even at these temperatures, the amount of carbazole produced in relation to the amount of benzene produced is substantially greater than that produced at temperatures below 400° C. Presented with the information set forth herein, those skilled in the art will be able to choose the desired maximum operating temperature above 400° C.

The runs represented by the temperature-conversion curves A and B were conducted using 70 cubic centimeters of the magnesium-oxide-supported platinum catalyst containing 2.1±0.1 percent platinum. The runs were conducted in a conventional catalyst tube, the portion of the tube containing the catalyst being the reaction zone. Heated liquid diphenylamine was introduced at one end of the catalyst tube and further heated before entering the reaction zone to volatilize the diphenylamine. Steam and hydrogen were introduced prior to the reaction zone, these gaseous components mixing with the volatilized diphenylamine prior to entry into the reaction zone for contact with the catalyst. The diphenylamine feed rate was 10 grams in 67 minutes in all cases. The hydrogen feed rate was about 170 cubic centimeters per minute. All runs were conducted at a water feed rate of 6.5 grams per hour.

For the purpose of the data in this application, the percent conversion is the yield of carbazole calculated on the basis of the total amount of diphenylamine introduced into the reaction zone. The percent yield, on the other hand, is the yield of carbazole calculated on the basis of the net amount of diphenylamine used in the system. The net amount of diphenylamine is the amount of diphenylamine introduced into the reaction zone, less the amount of unconverted diphenylamine emerging from the reaction zone.

Whether the process is conducted as a cyclic operation, with recycling of the recovered unconverted diphenylamine, or as a batch operation without recycling, it is desirable to correlate high conversion with high yield. High correlation between conversion and yield at these operating temperatures may be obtained by controlling the rate at which the diphenylamine is fed into the reaction zone for contact with the catalyst. Table I provides data as to the relationship between diphenylamine feed rate and the percent conversion and percent yield. As the diphenylamine feed rate increases, the percent conversion per pass over the magnesium-oxide-supported platinum catalyst decreases, although the percent yield may remain substantially the same. Thus, in a cyclic operation, if the diphenylamine feed rate is excessively large, the greater is the number of passes required with the unconverted diphenylamine to obtain high quantity conversion. As the data of Table I indicate, a feed rate of about 10 grams per hour per 70 cubic centimeters, bulk volume, of catalyst is preferable, the process remaining operable at higher feed rates but becoming unduly inefficient at around 30 grams/hr./70 cc. catalyst.

Periodically, as the activity of the catalyst decreases, the catalyst may be regenerated by exposing it to air or oxygen at elevated temperatures. The regeneration may be conducted at the same temperatures at which the cyclodehydrogenation reaction is conducted. After each regeneration period, air or oxygen is purged from the reaction zone, so that the cyclodehydrogenation reaction is conducted in the absence of oxygen, which, if present in large amounts, interferes with the cyclodehydrogenation reaction.

The various variables entering into the catalytic cyclodehydrogenation process were evaluated. The data of Table II clearly illustrate the effect of regeneration of the catalyst. Other conditions being held constant, a significant increase in percent conversion was obtained after regeneration. The large number of runs conducted with the same catalyst also indicate that the magnesium-oxide-supported platinum catalyst tends toward long life. In fact, the magnesia-supported catalyst appears to remain active for a greater period of time than do other known catalysts for this purpose.

Table III specifically indicates the hydrogen feed rate dependence of the cyclodehydrogenation reaction. It can be seen from examining the data in Table III that increasing the hydrogen feed rate above about 170 cubic centimeters per minute has for practical purposes no effect on the percent conversion or yield of carbazole. Even at a hydrogen feed rate of 20 cubic centimeters per minute, however, the percent conversion and yield are substantial. From an examination of Table III, one skilled in the art could determine the optimum hydrogen feed rate to use in the catalytic cyclodehydrogenation reaction of this invention.

Table IV illustrates the effect of variation of the steam feed-rate on the cyclodehydrogenation reaction. The beneficial effect of the presence of steam during the cyclodehydrogenation reaction is shown by the data in this table. Substantially increasing the steam feed rate, as long as some steam was present in the reaction chamber, has little effect on the percent conversion and yield. A steam feed rate of about 6.5 grams per hour was selected as a constant when it was desired to study other variables of the reaction. This does not mean to indicate that a lower or higher steam feed rate would not result in satisfactory percentages of conversion and yield of the carbazole (see data of Table IV).

As can be seen from examination of the last column of Table V, excellent material balance was obtained for the runs tabulated therein.

The following examples specifically illustrate the catalytic cyclodehydrogenation of diaryl amines and diamines by means of applicants' process.

EXAMPLE I

Magnesium oxide, light powder, was first densified by compression in a tableting machine. The tablets were ground and screened to 70 to 140 mesh. This powder was soaked, with agitation overnight, in aqueous chloroplatinic acid which had been neutralized with ammonium hydroxide. The bulk of the liquid was removed by centrifugation and the solid dried and repelleted. About 70 cubic centimeters of this catalyst was calcined in a Vycor reactor tube and reduced overnight at 470 to 490° C. in a slow stream of hydrogen gas. 70 cubic centimeters bulk volume, of the magnesium-oxide-supported catalyst, containing 2.1±0.1 percent platinum were placed in the reaction zone of the catalyst tube. Ten grams of liquid diphenylamine were introduced dropwise into the preheat section of the catalyst tube over the period of 67 minutes. The catalyst tube was mounted in a vertical position. The temperature in the reaction zone of the catalyst was maintained at 560° C. Steam was passed into the preheat section of the catalyst tube at the rate of 6.5 grams of water per hour. Hydrogen was simultaneously fed through the preheat section and reaction zone at the rate of 170 cubic centimeters per minute. The product carbazole was collected in an appropriate vessel at the end of the catalyst tube. A Dry-Ice-cooled trap was used to collect the benzene which is swept from the product receiver by the hydrogen stream. As an alternative procedure, the diphenylamine may be introduced into the reaction zone with the aid of a carrier vapor. Conveniently, the steam and/or the hydrogen may be used as the carrier. The unconverted diphenylamine recovered from the reaction products may be recycled to the reaction zone. The product collected was slurried with 100 cubic centimeters of methanol, filtered, and washed with 40 additional cubic centimeters of methanol to extract therefrom any by-products, including unconverted diphenylamine, from the carbazole produced. The insoluble carbazole remaining was then dried and weighed to determine the percent of the diphenyamine converted to carbazole. Since the carbazole is not completely insoluble in the methanol, the percent conversion figures indicated in the tables are slightly lower than the actual percent conversion.

EXAMPLE II

Ten grams of phenyl-beta-naphthylamine were passed over the magnesium-oxide-supported platinum catalyst, prepared as described in Example I, in a period of approximately 60 minutes. The phenyl-beta-naphthylamine, maintained at a temperature sufficient to keep it in liquid form, was dropped at a constant rate directly into the preheat section of the catalyst tube. Seventy cubic centimeters of the magnesium-oxide-supported catalyst containing 2.1±0.1 percent platinum were used. The reaction zone of the catalyst tube was maintained at about 560° C. Hydrogen at a feed rate of 170 cubic centimeters per minute and steam at a feed rate of 6.5 grams per hour were introduced directly into the preheat section of the reaction tube. The product was collected in a flask at the bottom of the reaction tube. The product collected was slurried with 100 cubic centimeters of benzene and washed with additional benzene to separate the 2,3-benzocarbazole formed. To verify the identity of the product, the N-acetyl derivative was prepared. This derivative had a melting point of 117–118° C. The melting points for the N-acetyl derivative of 2,3-benzocarbazole reported in Beilstein, Handbuch der Organischen Chemie, XX, p. 494, are 117° and 121° C.

EXAMPLE III

Ten grams of phenyl-alpha-naphthylamine were passed over 70 cc. of the magnesium oxide-supported platinum catalyst, prepared as described in Example I, in a period of 52 minutes while the reaction zone was maintained at 568° C. Hydrogen and steam were introduced as in Example II. The product, collected in a flask at the bottom of the reaction tube, was dissolved in benzene, filtered and treated with dry hydrogen chloride gas to precipitate unconverted starting material as its hydrochloride which was removed by filtration. The benzene and excess hydrogen chloride were removed by evaporation, the residue was dissolved in hot methanol, treated with decolorizing carbon, filtered, and the product, 1,2-benzocarbazole, was alllowed to crystallize on standing. The white crystalline product had a melting point of 228–229° C. The melting point of 1,2-benzocarbazole is reported as 225–225.5° C. by Japp and Maitland, Journal of the Chemical Society, vol. 83, p. 267 (1903).

EXAMPLE IV

Five grams of N,N'-diphenyl-p-phenylenediamine, introduced as a 20 percent solution in hot xylene, were passed over the magnesium oxide-supported platinum catalyst held at 565° C. during a period of 70 minutes. Hydrogen and steam were introduced into the reaction zone as in Example II. The reaction product was collected in a flask at the bottom of the reaction tube and extracted consecutively with hot xylene and acetone to remove unreacted starting material and by-products. The product was recrystallized from boiling quinoline to give a light yellow crystalline material which begins to darken without apparently melting, above 480° C. Its structure was proven to be indolo-[3,2-b]carbazole by the identity of its infrared spectrum with that of a material obtained by reduction with tin and hydrochloric acid of the corresponding dehydro compound prepared from indole-3-aldehyde according to Fearon and Boggust, Biochemical Journal, vol. 46, p. 62 (1950).

EXAMPLE V

Twelve and one-half grams of molten N,N'-diphenyl-m-phenylenediamine were introduced during 88 minutes into the reaction tube containing magnesium oxide-supported platinum catalyst at 500° C. Hydrogen and steam were also added as in Example II. The reaction mixture, collected in a flask at the bottom of the tube, was extracted with methanol to remove starting material and by-products. The methanol-insoluble material was twice recrystallized from zylene to give a product melting at 358–360° C. Its structure is assigned as indolo-[2,3-b]-carbazole on the basis of its infrared spectrum and elemental analysis: Calculated for $C_{18}H_{12}N_2$: C, 84.38%; H, 4.69%; N, 10.94%. Found: C, 84.46%; H, 4.99%; N, 11.01%.

EXAMPLE VI

It is additionally notable that, while those diaryl amines and diamines in which the aryl groups are phenyl or fused ring substituted phenyl groups react generally in accordance with the present invention to form the corresponding carbazole, as illustrated by the foregoing examples; the substituted diaryl compounds of this class do not produce the corresponding substituted carbazoles, but yield the unsubstituted product by the process of this invention. Thus, attempts to react N-ethyldiphenylamine, di-p-tolylamine, 2-nitrodiphenylamine, p-fluorodiphenylamine, and p-hydroxy diphenylamine failed in each instance to produce the corresponding substituted carbazole, but in each case gave carbazole itself. Accordingly, the diaryl amines and diamines as a class react generally to produce a carbazole according to the process of this invention, even though substituents do not survive the reaction; and, as substituted members of this class might in particular circumstances be employed in the process advantageously for producing unsubstituted carbazoles, and as such use of the process would be within the scope of the invention, the representative preparation of carbazole from p-hydroxy diphenylamine is described below to illustrate this use of the process:

Twenty grams of molten p-hydroxy diphenylamine were introduced during 106 minutes into the reaction tube containing 70 cc. of the magnesium oxide-supported platinum catalyst maintained at 455° C. Steam and hydrogen were introduced at rates of 6.5 grams per hour and about 170 cubic centimeters per minute, respectively. The product was collected in a flask at the bottom of the reaction tube and extracted with methanol as in Example I. The methanol insoluble portion of the product proved to be carbazole (melting point 241–243° C.) and was obtained in about 50 percent yield. The methanol soluble portion of the product was identified as unreacted p-hydroxy diphenylamine. No 3-hydroxy carbazole (melting point reported as 260–261° C. by Ruff and Stein, Berichte der deutschen Chemischen Gesellschaft, vol. 34, p. 1683 (1901)), could be found in either fraction of the product, benzene and ammonia being the only identifiable by-products.

In addition to the studies described above conducted with a magnesia-supported catalyst containing 2.1±0.1 percent platinum, experiments were also conducted with a magnesia-supported catalyst containing 0.8 percent platinum. Table V lists the data utilizing this catalyst. In these experiments, 10 grams of diphenylamine were fed over 70 cubic centimeters of the catalyst in a period of 57 minutes. Water, in the form of steam, was fed at the rate of about 6.5 grams per hour, while the hydrogen feed rate was 200 cubic centimeters per minute except when noted otherwise. The catalyst temperature for these experiments was approximately 565° C.

Some differences are noted in the comparison of this catalyst's performance with that of the higher platinum content. It appears that benzene production is lower and, partly but not entirely as a consequence, yields are somewhat better in general. Less degradation appears to occur as indicated by the higher material balance values. On the other hand, conversion to carbazole is lower and declines more rapidly after regeneration. In general, it would appear that the magnesia catalyst containing about 2 percent platinum is superior to the lower-platinum-content catalyst.

The above description of this process and the data represented herein are intended as illustrative of the invention and not restrictive thereof other than as set forth in the appended claims.

The above-described invention has many advantages obvious to those skilled in the art. Included among the advantages of the magnesium-oxide-supported platinum catalyst over other known catalysts for this purpose are: (1) higher conversions, (2) catalyst activity retained for a longer period of time, (3) restoration of the activity of the catalyst (by burning off carbonaceous material) is more complete, and (4) less deposition of carbon on the catalyst.

Table I

CONVERSION AND YIELD AS FUNCTIONS OF FEED RATE [a]

| Time to Feed 10 g. DPA (min.) | Conversion, percent | Yield, percent |
|---|---|---|
| 67 [b] | 61 | 75 |
| 51 | 61 | 77 |
| 30 | 55 | 79 |
| 22 | 43 | 77 |

[a] Temperature, hydrogen, and steam feeds held constant at 560° C., 170 cc./min. and 6.5 g./hr., respectively.
[b] Average of four runs. Other rates one run each.

Table II

TABLE ILLUSTRATING THE LONG LIFE AND REGENERATABILITY OF THE PLATINUM-MAGNESIA CATALYST [a]

| Cumulative, DPA Fed, g. | Benzene, ml. | Conversion, percent | Yield, percent |
|---|---|---|---|
| 650 | 0.6 | 50 | 74 |
| Regenerate | | | |
| 660 | 0.4 | 69 | 81 |
| 670 | 0.3 | 71 | 82 |
| 770 | 0.4 | 68 | 82 |
| 870 | 0.5 | 59 | 80 |
| Regenerate | | | |
| 970 | 0.5 | 70 | 79 |
| 980 | 0.5 | 73 | 82 |
| 990 | 0.5 | 73 | 82 |
| 1000 | 0.6 | 72 | 79 |
| 1480 | 0.7 | 64 | 76 |
| Regenerate | | | |
| 1490 | 0.4 | 69 | 78 |
| 1500 | 9.5 | 70 | 80 |
| 2000 | 0.9 | 63 | 71 |
| 2100 | 0.8 | 57 | 71 |
| Regenerate | | | |
| 2110 | 0.3 | 67 | 74 |
| 2120 | 0.3 | 75 | 82 |
| 2130 | 0.4 | 71 | 78 |
| 2270 | 0.9 | 61 | 67 |
| Regenerate | | | |
| 2280 | 0.4 | 72 | 80 |

[a] For all runs: 10 g. DPA fed in 57 min. to 65 cc. catalyst containing about 2 percent platinum; $H_2$ at about 170 cc./min., $H_2O$ at 6.5 g./hr. Temperature at 560–565° C.

Table III

HYDROGEN FEED-RATE DEPENDENCE OF THE CYCLODEHYDROGENATION REACTION

| $H_2$ Feed-Rate, cc./min. | Benzene, ml. | Conversion, percent | Yield, percent | No. Runs Averaged |
|---|---|---|---|---|
| 20 | 0.3 | 48 | 77 | 1 |
| 55 | 0.5 | 59 | 80 | 1 |
| 125 | 0.6 | 65 | 85 | 1 |
| 170 | 0.7 | 71 | 82 | 14 |
| 350 | 0.5 | 72 | 83 | 2 |
| 560 | 0.7 | 74 | 83 | 2 |
| 785 | 0.8 | 73 | 82 | 2 |

Table IV

STEAM FEED-RATE DEPENDENCE OF THE REACTION [a]

| Steam Feed-Rate, g./hr. | Conversion, percent | Yield, percent | Conversion to Benzene, percent | No. Runs Averaged |
|---|---|---|---|---|
| 0 | 47 | 79 | 2 | 1 |
| 1.1 | 67 | 79 | 7 | 2 |
| 3.1 | 67 | 78 | 7 | 2 |
| 6.5 | 66 | 78 | 6 | 7 |
| 10.9 | 65 | 79 | 6 | 2 |
| 17.0 | 70 | 79 | 6 | 1 |
| 34.4 | 62 | 75 | 5 | 1 |

[a] Temperature, DPA feed-rate and $H_2$ feed-rate constant at 560°, 10 g./67 min. and 170 cc./min. respectively.

Table V
EVALUATION OF THE LOW PLATINUM-MAGNESIA CATALYST [a]

| Run No. | Cumulative, DPA Fed. g. | Benzene, ml. | Conversion, percent | Yield, percent | Material Balance, percent |
|---|---|---|---|---|---|
| 1 | 10 | 0.4 | 72 | 84 | 90 |
| 2 | 20 | 0.3 | 71 | 89 | 94 |
| 6 | 60 | 0.1 | 69 | 89 | 92 |
| 11 | 110 | 0.3 | 62 | 90 | 96 |
| 12 | 120 | 0.2 | 59 | 91 | 96 |
| Regenerate | | | | | |
| 13 | 130 | 0.3 | 69 | 90 | 95 |
| 14 | 140 | 0.2 | 71 | 90 | 94 |
| 19 | 190 | 0.3 | 63 | 89 | 95 |
| 24 | 240 | 0.3 | 58 | 89 | 95 |
| Regenerate | | | | | |
| 25 | 250 | 0.3 | 60 | 83 | 91 |
| 28 | 280 | 0.3 | 66 | 87 | 93 |
| 38* | 380 | 0.3 | 52 | 85 | 93 |
| 39* | 390 | 0.3 | 47 | 84 | 94 |
| Regenerate | | | | | |
| 40 | 400 | 0.3 | 64 | | |

[a] All runs at 565–570° C.; 10 g. DPA/57 minutes fed over 70 cubic centimeters catalyst; $H_2O$ at 6.5 g./hr., $H_2$ at 200 cc./min. (except (*) where $H_2$ at 270 cc./min.) catalyst contained 0.8 percent platinum.

What is claimed is:

1. An improved method for synthesizing carbazole comprising introducing to a reaction zone, in the absence of air and oxygen, and in the presence of a catalyst consisting essentially of platinum supported on magnesium oxide, a vaporized amine selected from the group consisting of diphenylamine, N-ethyldiphenylamine, di-p-tolylamine, 2-nitrodiphenylamine, p-fluorodiphenylamine, and p-hydroxydiphenylamine, maintaining said reaction zone at a temperature within the range of 400° C. to 650° C. and recovering the carbazole thus formed.

2. A method as defined in claim 1 and further characterized in that steam is maintained in said reaction zone for enhancing the activity of said catalyst.

3. A method as defined in claim 1 and further characterized in that hydrogen is maintained in said reaction zone for prolonging the activity of said catalyst.

4. A method as defined in claim 1 and further characterized in that the reaction in said reaction zone is conducted in the presence of a mixture of steam and hydrogen.

5. A method as defined in claim 1 and further characterized in that the amine is introduced to said reaction zone at a feed rate not exceeding about 10 grams per hour per 70 cubic centimeters, bulk volume, of catalyst.

6. A method as defined in claim 1 and further characterized in that the catalyst of platinum supported on magnesium oxide contains from 2.0% to 2.2% platinum.

7. An improved method for synthesizing a benzocarbazole comprising introducing to a reaction zone, in the absence of air and oxygen, and in the presence of a catalyst consisting essentially of platinum supporting on magnesium oxide, a vaporized naphthylamine selected from the group consisting of phenyl-beta-naphthylamine and phenyl-alpha-naphthylamine, maintaining said reaction zone at a temperature within the range of 400° C. to 650° C. and recovering the benzocarbazole thus formed.

8. A method as defined in claim 7 and further characterized in that steam is maintained in said reaction zone for enhancing the activity of said catalyst.

9. A method as defined in claim 7 and further characterized in that hydrogen is maintained in said reaction zone for prolonging the activity of said catalyst.

10. A method as defined in claim 7 and further characterized in that the reaction in said reaction zone is conducted in the presence of a mixture of steam and hydrogen.

11. A method as defined in claim 7 and further characterized in that the naphthylamine is introduced to said reaction zone at a feed rate not exceeding about 10 grams per hour per 70 cubic centimeters, bulk volume, of catalyst.

12. A method as defined in claim 7 and further characterized in that the catalyst of platinum supported on magnesium oxide contains from 2.0% to 2.2% platinum.

References Cited in the file of this patent
UNITED STATES PATENTS

| | | |
|---|---|---|
| 2,456,378 | Cislak et al. | Dec. 14, 1948 |
| 2,727,901 | Kreuz | Dec. 20, 1955 |
| 2,921,942 | Grotta | Jan. 19, 1960 |

FOREIGN PATENTS

| | | |
|---|---|---|
| 716,876 | Great Britain | Oct. 13, 1954 |

OTHER REFERENCES

Dobeneck et al.: Chemische Berichte, vol. 87, page 455 (1954).

Brunton et al.: J. Chem. Society (London, pages 4783–4785) (1956).

Swindells et al.: J. Chem. Society (London, pages 1135–1138) (1956).

UNITED STATES PATENT OFFICE
CERTIFICATE OF CORRECTION

Patent No. 3,041,349                  June 26, 1962

Arthur E. Bearse et al.

It is hereby certified that error appears in the above numbered patent requiring correction and that the said Letters Patent should read as corrected below.

Column 3, line 10, for "synethetic" read -- synthetic --; column 6, line 29, for "allpwed" read -- allowed --; column 8, Table II, under the heading "Benzene, ml.", line 12 thereof, for "9.5" read -- 0.5 --.

Signed and sealed this 16th day of October 1962.

(SEAL)
Attest:

ERNEST W. SWIDER
Attesting Officer

DAVID L. LADD
Commissioner of Patents